United States Patent [19]
Emmerson et al.

[11] 3,810,711
[45] May 14, 1974

[54] COOLED TURBINE BLADE AND ITS MANUFACTURE

[75] Inventors: Calvin W. Emmerson; George B. Meginnis, both of Indianapolis; Jay O. Steinbarger, Camby, all of Ind.

[73] Assignee: General Motors Corporation, Detroit, Mich.

[22] Filed: Sept. 22, 1972

[21] Appl. No.: 291,212

[52] U.S. Cl. .................................. 416/97, 416/193
[51] Int. Cl. ...... F01d 5/08, F01d 5/18, F04d 29/58
[58] Field of Search ............ 416/96, 96 Z, 97, 97 A; 29/156.8 T, 156.8 H

[56] References Cited
UNITED STATES PATENTS

| | | | |
|---|---|---|---|
| 3,644,059 | 2/1972 | Bryan | 416/96 |
| 3,616,125 | 10/1971 | Bowling | 416/90 |
| 3,606,572 | 9/1971 | Schwedland | 416/90 |
| 2,788,569 | 4/1957 | Stalker | 29/156.8 |
| 2,584,972 | 6/1971 | Bratkovich | 416/229 |

*Primary Examiner*—Everette A. Powell, Jr.
*Assistant Examiner*—Louis T. Casaregola
*Attorney, Agent, or Firm*—Paul Fitzpatrick

[57] ABSTRACT

A turbine blade includes a hollow strut covered with a porous laminated material to provide a cooled blade portion and includes a supporting strut portion terminating in one or two bases for attachment to a turbine wheel. It also includes a blade platform bicast to the strut at the junction of the blade and supporting portions. The strut may be fabricated by casting or forging two parts, each defining one face of the strut, bonding these together at the leading edge of the airfoil, machining the leading edge portion, fitting the facing to the blade portion of the strut and bonding these together, then forming the blade portion to the desired airfoil contour and thereafter bicasting the platform onto the strut so as to cover the platform end of the blade facing.

1 Claim, 13 Drawing Figures

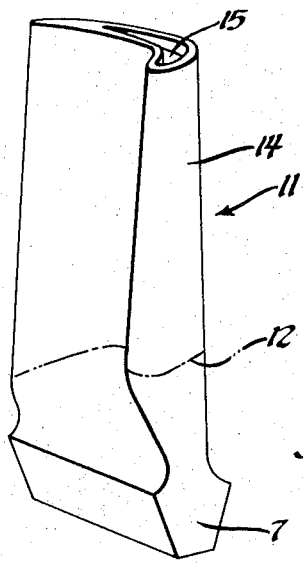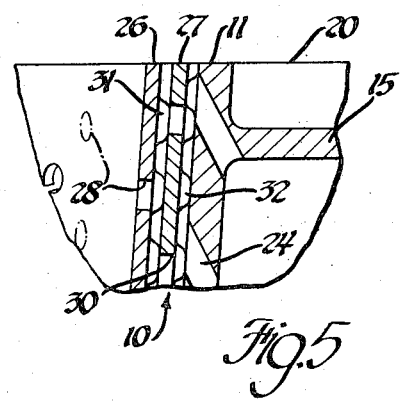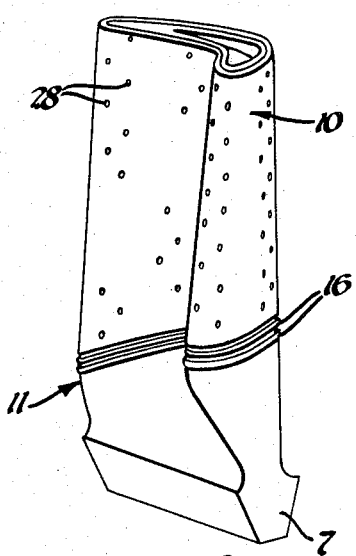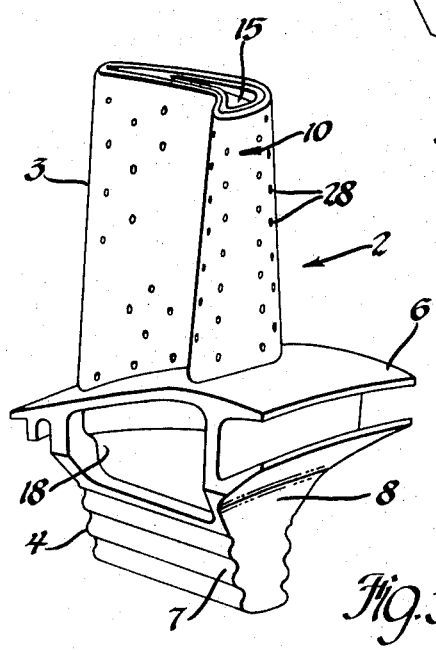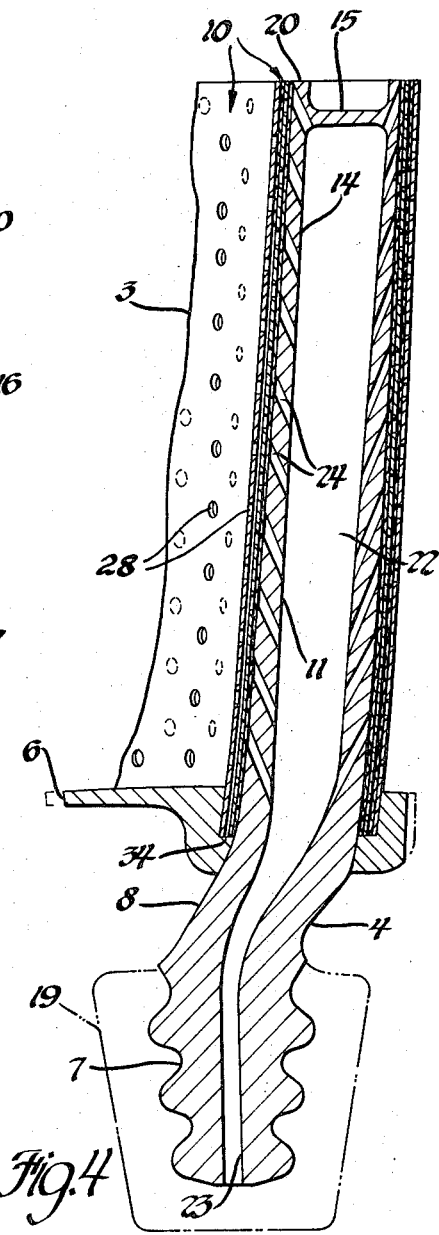

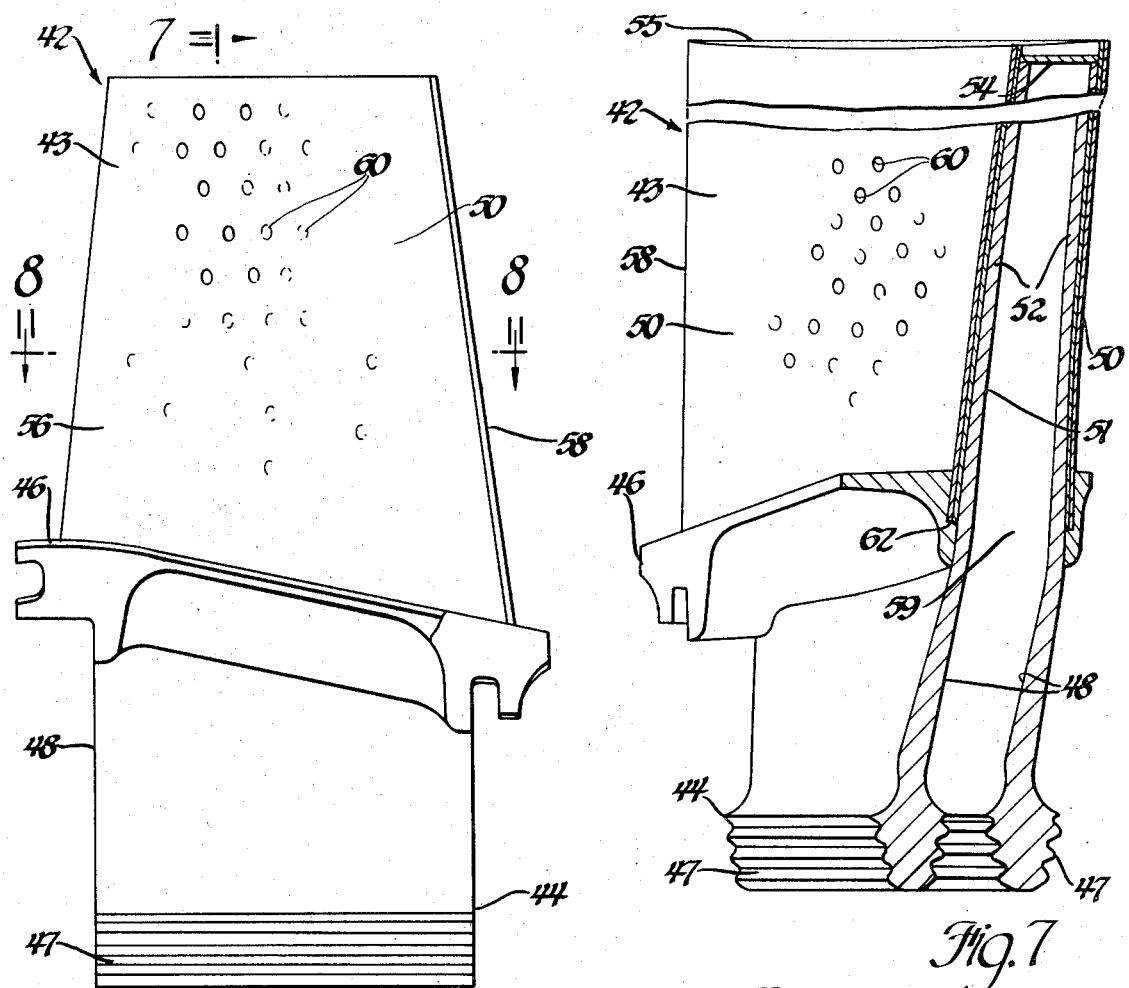
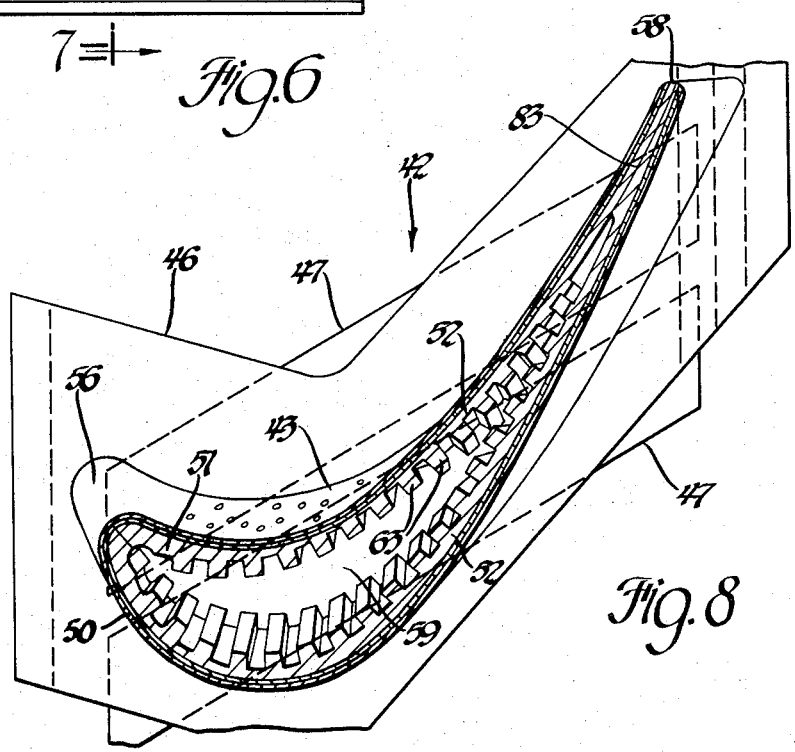

COOLED TURBINE BLADE AND ITS MANUFACTURE

The invention described and claimed herein was made in the course of work under a contract with the Department of Defense.

Our invention is directed to the provision of cooled fluid-directing members for turbomachines such as commonly are called rotor blades and nozzle vanes. Specifically, our invention is directed to improved structure of such members, which may be called blades for conciseness, and to a novel process for the fabrication of the preferred blade structure.

There have been many proposals to cool turbine blades so as to enable them better to withstand a very high temperature environment by flowing a gas such as air through a porous blade facing into the passing motive fluid. The discharge of the cooling gas through multifarious pores in the surface of the blade is known as transpiration cooling. The blade is cooled by the air within the blade, by convection as the air passes through the wall of the blade, and by the shielding of the outer surface of the blade from the motive fluid by the cooling gas discharged over the surface.

There have also been proposals to provide blades in which some sort of strut or support is covered by a porous outer layer, which might be sintered metal, a wire wrapping, or a laminated porous sheet, for example. A porous laminated sheet material which has been developed recently, known as Lamilloy (trademark) is particularly suitable for facing turbine blades and other structures in hot environments. Our invention is particularly directed to exploiting the advantages of such laminated material, although some aspects of the invention might be employed with other porous blade facings.

Blades and vanes incorporating such porous laminated material are disclosed in the following U.S. Pats: Bratkovich et al., No. 3,584,972, June 15, 1971; Emmerson, No. 3,529,902, Sept. 22, 1970; Meginnis, No. 3,619,082, Nov. 9, 1971; Helms, No. 3,554,663, Jan. 12, 1971; Bowling, No. 3,616,125, Oct. 26, 1971; and Schwedland, No. 3,606,572, Sept. 20, 1971; and Bowling et al., No. 3,732,031, May 8, 1973.

Our invention is directed to a structure and a process of forming the structure which, so far as it is directed specifically to a turbine rotor blade, has numerous features and advantages. First, the blade includes a rigid spar providing a support for the blade facing and providing a base for attachment of the blade to the rotor. The porous sheet facing is attached to the strut by diffusion bonding at a multiplicity of projections distributed over the interior face of the facing. The full thickness of the facing covers the entire circumference of the strut.

Also, the discontinuity between the support spar and the sheet metal facing is buried inside a bicast metal platform well isolated from oxidation and protected from possible fatigue failure without the use of welding, brazing, or similar process which might change the basic physical properties of the spar.

All the centrifugal loads are carried by the strut, the facing and platform both being attached to the strut generally independently of each other. Since the platform does not carry any primary loads, it may be made of a weaker but more oxidation resistant alloy than the cast spar.

Our invention also represents an improvement in the process of making the airfoil portion of the blade, particularly the leading edge portion, to overcome problems in fabrication. Such problems are referred to in U.S. Pat. No. 3,606,572, which discloses another approach to solution of the leading edge forming problem.

It may be noted that some features and aspects of our invention are also applicable to turbine nozzle vanes, which differ from blades primarily in that the mode of attachment of the structure differs, largely because there are no centrifugal loads to be considered. In the case of vanes, the platform becomes one shroud, and ordinarily there is a shroud at the other end of the vane, as shown in U.S. Pat. No. 3,529,902. There is no extended stalk or foot as in the usual rotor blade.

The principal objects of our invention are to provide improved fluid-directing members for turbomachinery with improved cooling provisions and to provide an improved mode of fabrication of such devices, particularly with respect to formation of the leading edge. A further object is to provide a turbine blade in which the loads are carried by a unitary strut upon which are mounted a porous facing and a blade platform, with the blade platform covering the joint between the facing and strut at the end of the facing.

Other objects and advantages of our invention will be clear to those skilled in the art from the succeeding detailed description and accompanying drawings of preferred embodiments of the invention.

Referring to the drawings,

FIG. 1 is an axonometric view of a cast blade strut.

FIG. 2 is a similar view of the strut with a porous facing covering the blade portion of the strut.

FIG. 3 is a similar view of the completed blade with the platform cast in place and the root machined.

FIG. 4 is a sectional view of a cooled turbine blade taken on a plane extending spanwise of the blade and roughly perpendicular to the blade faces.

FIG. 5 is an enlarged view of a portion of FIG. 4.

FIG. 6 is a side elevation view of a turbine blade, illustrating a different formation of the blade base and platform.

FIG. 7 is a transverse sectional view of the same, taken on the plane indicated by the line 7—7 in FIG. 6.

FIG. 8 is a transverse sectional view of the same taken on the plane indicated by the line 8—8 in FIG. 6.

Figure 9:
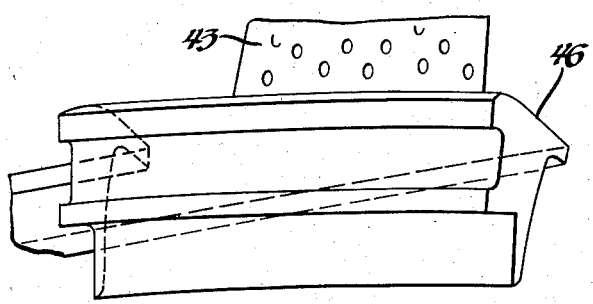
FIG. 9 is a detail view illustrating the blade platform.

FIGS. 1, 2, and 3 illustrate successive steps in the fabrication of one form of blade structure. Referring first to FIG. 3 which shows the finished fluid-reacting member or blade, which will be called a blade henceforth in the specification, the blade 2 includes a blade portion proper or airfoil 3, a base or supporting portion 4, and a platform 6 at the junction between the supporting portion and blade portion or, as may be said, at the base of the blade. The base portion includes a serrated foot 7 and a stalk 8.

The blade portion is covered with a laminated porous facing 10 which has numerous pores through each layer and may be of the type described in U.S. Pat. No. 3,584,972. The facing 10 and platform 6 are supported on a precision cast strut 11 (FIG. 1) of which the base portion is below the broken line 12 in FIG. 1 and the portion above that line is the blade portion. In FIG. 1, the foot 7 of the strut is in unmachined condition and the facing and platform have not been applied. The strut is hollow and its outer end is closed by a web 15.

FIG. 2 illustrates a further step in the fabrication of the blade, with the porous facing 10 applied to the blade portion 14 of the strut 11. The facing is formed to the same shape as the strut and fits it closely. It may be bonded to the strut by diffusion bonding. Note that FIG. 2 illustrates two grooves 16 cast, ground, or otherwise formed in the strut 11 to provide a positive anchorage for the platform 6 when the platform is cast to the strut and facing.

This may be accomplished by placing the partially completed blade in a suitable mold having a cavity of the proper contour for casting the platform 6 and then pouring the metal into the mold, the molten metal thus being bicast to the base and coming up slightly over the base end of the facing as illustrated in FIGS. 2 and 3. In the completed blade, an opening 18 is provided for admission of cooling air into the hollow strut. The strut is perforated to deliver the cooling air to the facing 10.

For a more detailed showing of a preferred embodiment of a blade structure, attention is directed to FIGS. 4 and 5 in which parts previously described are given reference numerals as used above. FIGS. 4 and 5 incidentally illustrate one manner in which cooling air might be conducted to and through the facing 10 of FIG. 3.

In FIG. 4, the outline of the unmachined root is indicated at 19. The strut 11 extends from the root 7 to the tip of the blade at 20 just above the web 15. The hollow strut defines a cooling air entrance in the root at 23 and a cooling air passage or manifold 22 extending to the web 15. Cooling air is distributed from this manifold through numerous small passages 24, which preferably incline toward the tip of the blade from the manifold 22. These passages are distributed over the area of the strut so as to provide for distribution of cooling air to the exterior surface of the strut. The size and spacing of the passages may be varied if desired to accommodate to different requirements for cooling at different areas. The facing 10 comprises two layers of sheet metal bonded together, an outer layer 26 and an inner layer 27. Both these layers have pores, as indicated at 28 in the outer sheet and 30 in the inner sheet, the pores in one sheet being offset from those in the other. Sheet 26 bears bosses or projections 31 and sheet 27 bears spaced bosses 32. The bosses 31 are bonded to sheet 27 and the bosses 32 are bonded to the strut 11. Air which is discharged through the passages 24 may flow between the strut and the inner surface of sheet 27 around the bosses 32 and through pores 30, then flow between sheets 27 and 26 around the bosses 31 and ultimately be discharged through pores 28 which are out of register with the pores 30.

FIG. 4 also illustrates a platform 6 which may be of a simpler form than that illustrated in FIG. 3, which has been cast in place, bonding to the stalk 8 and covering what may be termed the base end of the facing 10 which terminates at 34.

FIGS. 6 through 10 depict a further form of fluid-reacting member or blade embodying the principles of structure and cooling which have been described above. Specifically, the blade 42 of FIGS. 6 to 10 differs from those previously described in the provision of a double base on the blade, in the contour of the blade platform, and in the provision of a spanwise ribbed strut. The blade 42 includes an airfoil or blade portion 43, a base or supporting portion 44, and a platform 46. The base includes two feet 47 serrated for mounting in corresponding dovetail grooves in a rotor and two approximately parallel stalks 48. The airfoil portion 43 is covered by a porous facing 50. Facing 50 is mounted on a strut 51 which in this case is made up of two roughly parallel plates 52 extending from the two feet 47 to a closure plate 54 just short of the tip of the blade at 55.

The two plates 52 meet at the leading edge 56 and trailing edge 58 of the blade. They define between them a manifold or passage 59 for cooling air or other cooling fluid, which may enter the blade between the stalks 48. The facing may be of the character described with respect to FIGS. 4 and 5, comprising two perforated layers with projections on the inner surface of each layer and with perforations extending through the layer, the perforations in the outer layer being indicated at 60 in FIGS. 6 and 7. The facing is diffusion bonded to the strut and the platform 46 is bicast over the strut and over the base end 62 of the facing.

Incidentally, it may be noted from FIG. 8 that the platform 46 has a somewhat dogleg outline to make it conform generally to the rather sharp camber of the airfoil.

Figure 10:
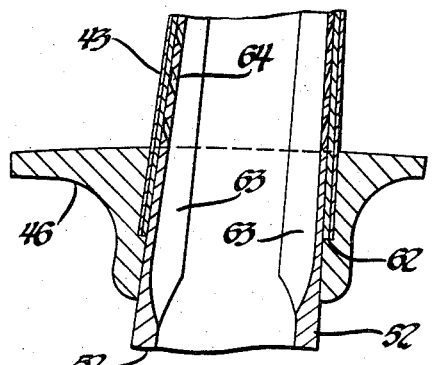
FIG. 10 is a partial transverse sectional view.

As shown clearly in FIGS. 8 and 10, the strut 51 in this form has numerous spanwise extending ribs 63 on its inner surface which serve to strengthen the strut and also to provide a thinner section where the passages 64 of FIG. 10 (corresponding to passages 24 of FIG. 5) pass through the wall of the strut. These ribs taper toward the blade tip (see also FIG. 12).

It should be understood that the two plates 52 in the form shown in FIG. 7 may be brought together, and fixed together if desired, at the root of the blade to form a single root such as is illustrated in FIG. 4. However, there are advantages to the configuration illustrated in FIG. 7.

Figure 11:
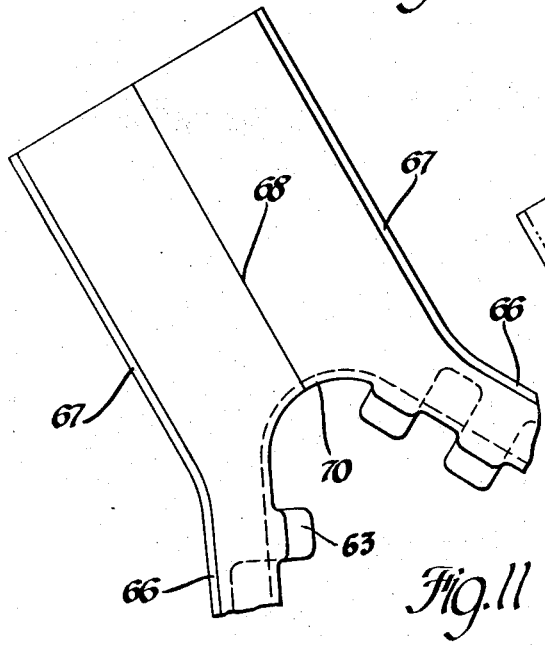
FIG. 11 is an end view of an unfinished blade illustrating a step in the formation of the leading edge.
Figure 12:
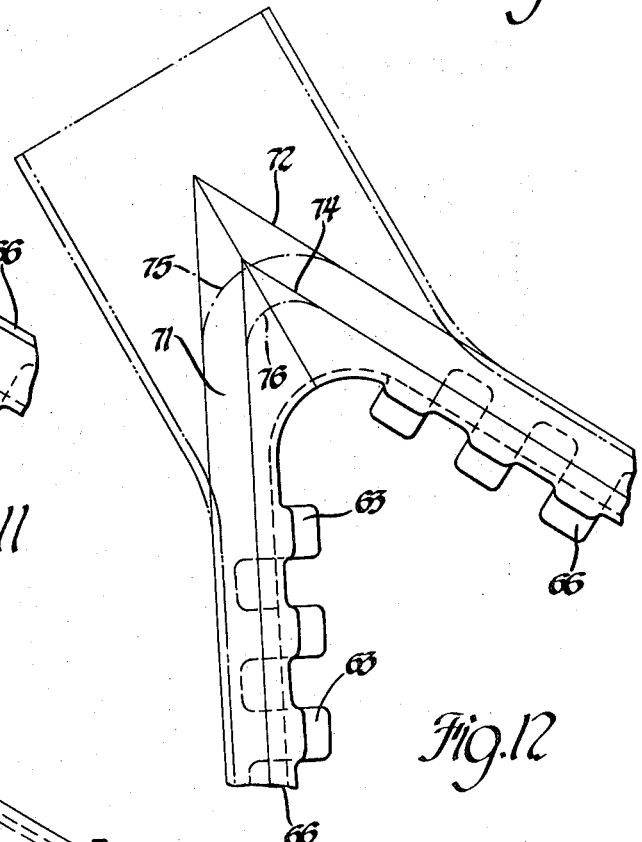
FIG. 12 is a similar view illustrating a further step in such formation.
Figure 13:
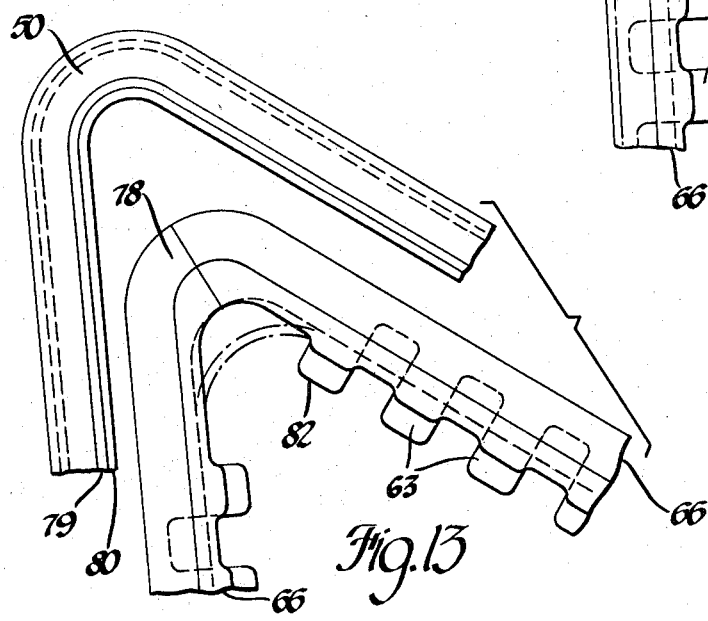
FIG. 13 is a similar view illustrating the application of the blade facing to the strut.

FIGS. 11, 12, and 13 are directed to illustration of a preferred method of forming the leading edge of a blade generally such as those illustrated in FIG. 3, 4, or 6. The structure illustrated is specifically that of the blade of FIGS. 6 through 10.

As mentioned above, there are some problems attendant upon forming the sheet metal laminated facing and thereafter bonding it to a strut or other support of this sort. There are problems in forming the leading edge and in bonding it to the leading edge of the strut. There are, of course, some problems attendant upon fabricating the strut as a single casting.

In the structure of FIGS. 6 through 10, the strut preferably is formed of two parts which may be cast or forged and which are joined at the leading edge and thereafter formed into the final desired airfoil cross section and joined at the trailing edge. At an intermediate point in this process, the facing is applied to the strut and bonded to the strut, and subsequently the strut and facing are formed to the airfoil contour jointly.

FIG. 11 shows the leading edge portion of the strut 51 of FIG. 8 in an early step in its fabrication. We may call this the association of two plate blanks 66. These plate blanks include the side wall portion of the plate which is later formed into the curved strut walls illustrated most clearly in FIG. 8 and also include portions 67 which include and project forward of the leading edge of the strut. The portions 67 are abutted along a surface 68 which is preferably, although not necessarily, plane. These two parts are then diffusion bonded or welded or otherwise suitably secured together, particularly adjacent the interior surface 70 of the leading edge. Note that the two plate blanks 66 diverge in a Y from their junction at 68. Then, as illustrated in FIG. 12, the outer surfaces of the blanks may be ground or otherwise machined away along the surface 71 bounded by lines 72 and 74 in FIG. 12. Subsequently, the leading edge nose is rounded off to complete its configuration as indicated by the broken lines 75 and 76 to leave the leading edge contour shown or indicated at 78 in FIG. 13.

At this point the facing 50 which is made up of layers 79 and 80 and which has been bent to conform to the leading edge and the outer surfaces of the blanks 66 is brought into position abutting the formed strut blank 82. The facing is of the character shown and described with respect to FIGS. 4 and 5. The facing is then diffusion bonded by heat and pressure in a vacuum or inert atmosphere so that the projections 32 on the facing are solidly affixed to the outer surface of the blank 82, which blank continues to a trailing edge portion at which the portions of the blank are tapered as indicated generally at 83 in FIG. 8. After the bonding operation, the complete assembly is formed under heat and pressure in a suitable die to the airfoil configuration illustrated in FIG. 8 and the edges of the blank are welded or brazed at the trailing edge to complete the airfoil part of the blade assembly. It is also possible to bond the facing to the strut and form the strut in a single operation. Thereafter, the platform 46 is bicast in place as described above, covering the base end of the facing. This is accomplished by mounting the blade assembly blank in a suitable mold defining a cavity corresponding to the platform, and then pouring metal into the cavity so as to fuse with and bond to the base of the strut 51.

We believe it will be clear to those skilled in the art that the blade structure as described has the advantages referred to in the introduction to this specification, and that the method of forming the structure is highly advantageous.

The detailed description of preferred embodiments of the invention for the purpose of explaining the invention is not to be considered in a limiting or restricting sense, as many modifications may be made by the exercise of skill in the art.

We claim:

1. A cooled fluid-reacting member for a turbomachine comprising, in combination, a hollow strut including a blade portion substantially of airfoil cross-section and a supporting portion; a porous facing bonded to and covering the blade portion; and a blade platform bicast to the strut at the junction of the blade and supporting portions and enclosing the proximate end of the facing; the facing being a laminated porous sheet having distributed pores for discharge of a cooling fluid and having an array of projections on the inner surface of the sheet distributed over the area of the blade portion, the projections being diffusion bonded to the strut; the strut defining a cooling fluid manifold within the strut and an array of passages distributed over the area of the blade portion for conducting the cooling fluid to the facing; the supporting portion having two generally parallel plates extending generally chordwise and spanwise of the member; each plate defining one face of the strut and each terminating in a separate base configured for attachment of the member to a supporting body.

* * * * *